US010449458B2

(12) United States Patent
Torres et al.

(10) Patent No.: US 10,449,458 B2
(45) Date of Patent: Oct. 22, 2019

(54) SKILL MATCHING FOR A MULTIPLAYER SESSION (71) Applicant: Microsoft Technology Licensing, LLC, Redmond, WA (US)

(72) Inventors: Wisgary Torres, Bellevue, WA (US); Keith Kline, Bothell, WA (US); Daniel Av, Kirkland, WA (US); Jefferson Ng, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/636,187

(22) Filed: Jun. 28, 2017

(65) Prior Publication Data

US 2018/0185759 A1 Jul. 5, 2018

Related U.S. Application Data (60) Provisional application No. 62/440,507, filed on Dec. 30, 2016.

(51) Int. Cl.
*A63F 13/795* (2014.01)
*A63F 13/798* (2014.01)
*A63F 13/35* (2014.01)

(52) U.S. Cl.
CPC ............ *A63F 13/795* (2014.09); *A63F 13/35* (2014.09); *A63F 13/798* (2014.09)

(58) Field of Classification Search
CPC ....... A63F 13/35; A63F 13/795; A63F 13/798
USPC .......................................................... 463/42
See application file for complete search history.

(56) References Cited

U.S. PATENT DOCUMENTS

| 7,614,955 | B2 | 11/2009 | Farnham et al. |
| 7,846,024 | B2 | 12/2010 | Graepel et al. |
| 8,175,726 | B2 * | 5/2012 | Herbrich ............. A63F 11/0051 700/91 |
| 8,496,529 | B2 | 7/2013 | Narita et al. |
| 8,538,910 | B2 | 9/2013 | Minka et al. |
| (Continued) | | | |

OTHER PUBLICATIONS

Agarwal, et al., "Matchmaking for online games and other latency-sensitive P2P systems", In Proceedings of the ACM SIGCOMM conference on Data communication, Aug. 17, 2009, pp. 315-326.

(Continued)

*Primary Examiner* — Chase E Leichliter
(74) *Attorney, Agent, or Firm* — Newport IP, LLC; Jacob P. Rohwer (57) ABSTRACT

The systems and techniques described herein generate a skill rating of a participant with respect to a new title. The system is configured to generate a generic skill rating algorithm based on an aggregate of parameters and parameter weights that already exist in established skill rating algorithms of other titles of a particular game category. Once the generic skill rating algorithm is generated, the system is configured to aggregate, organize, and plug participant performance data into the generic skill rating algorithm so that a representative skill rating for the participant can be calculated. The representative skill rating is provided to the new title thereby enabling the new title to effectively match participants in a multiplayer session of the new title such that a fair and a competitive gaming experience is realized.

20 Claims, 4 Drawing Sheets

(56) References Cited

U.S. PATENT DOCUMENTS

| | | |
|---|---|---|
| 9,120,020 B2 | 9/2015 | Michel et al. |
| 9,289,686 B2 | 3/2016 | Hall et al. |
| 9,352,234 B2 | 5/2016 | Curtis et al. |
| 9,375,641 B2 | 6/2016 | Shaw et al. |
| 2006/0287096 A1* | 12/2006 | O'Kelley, II ............ A63F 13/12 463/42 |
| 2008/0287190 A1* | 11/2008 | Fulton ..................... G07F 17/32 463/42 |
| 2009/0325709 A1* | 12/2009 | Shi .......................... G06Q 10/10 463/42 |
| 2013/0007013 A1* | 1/2013 | Geisner .................. A63F 13/12 707/748 |
| 2014/0025732 A1 | 1/2014 | Lin et al. |
| 2014/0243088 A1* | 8/2014 | Oikawa .................. A63F 13/12 463/31 |
| 2014/0274242 A1* | 9/2014 | Haswell ................. A63F 13/10 463/7 |
| 2015/0105153 A1* | 4/2015 | Xu ......................... A63F 13/795 463/31 |
| 2017/0259178 A1* | 9/2017 | Aghdaie ................. A63F 13/73 |
| 2018/0111051 A1* | 4/2018 | Xue ....................... A63F 13/795 |

OTHER PUBLICATIONS

Delalleau, et al., "Beyond Skill Rating: Advanced Matchmaking in Ghost Recon Online", In Journal of IEEE Transactions on Computational Intelligence and AI in Games, vol. 4, No. 3, Sep. 2012, pp. 167-177.

Manweiler, et al., "Switchboard: A matchmaking system for multiplayer mobile games", In Proceedings of the 9th international conference on Mobile systems, applications, and services, Jun. 28, 2011, pp. 71-84.

Minka, Tom, "TrueSkill™ Ranking System", Published on: Nov. 18, 2005 Available at: https://www.microsoft.com/en-us/research/project/trueskill-ranking-system/.

* cited by examiner

SKILL MATCHING FOR A MULTIPLAYER SESSION

PRIORITY APPLICATION

This application claims the benefit of and priority to U.S. Provisional Application No. 62/440,507 filed Dec. 30, 2016, the entire contents of which are incorporated herein by reference.

BACKGROUND

A multiplayer game provides players of a video game with the ability to compete against other players either individually or in a team setting. Various algorithms (e.g., TRUESKILL, ELO, etc.) can be used to evaluate results data collected over a period of time as a player participates in sessions of a title. These algorithms can also generate, based on the results data, a skill rating for the player, and the skill rating can be used to match the player with other players that have similar skills to enhance the gaming experience and to help ensure a fair and a competitive gaming environment based on skill level. The results data typically includes wins and losses, and thus, these algorithms conventionally generate skill ratings based solely on the wins and losses.

SUMMARY

This disclosure describes a system that generates a skill rating for a participant in a multiplayer session of a new title (e.g., a game recently released to the public). In many instances, the new title does not have its own skill rating algorithm. Nor does the new title have its own historical participant performance data based on a number of previous sessions played by a participant. Consequently, the new title is unable to effectively rate a participant based on skill level. The system described herein is configured to generate a generic skill rating algorithm that can be accessed (e.g., via an application programming interface) and used by a new title to rate players based on their respective skill levels. The skill ratings can then be used to match players in a multiplayer session of the new title so that a fair and a competitive gaming experience can be realized even though the new title lacks its own skill rating algorithm and/or historical participant performance data. The multiplayer session can be provided and/or hosted by resources (e.g., program code executable to generate game content, devices such as a server, networking functionality, etc.) developed and/or operated by a title. Thus, the title can comprise resources related to a developer, a publisher, and/or a host of a multiplayer game, for example.

The generic skill rating algorithm is generated based on an aggregate of parameters and parameter weights that already exist in established skill rating algorithms of other titles. The new title and the other titles can be part of a same game category (e.g., a "first-person shooter" category, a "racing" or "driving" category, a "flying" category, a manto-man "fighting" or "combat" category, a "soccer" category or other sport categories, a "role-playing" category, an "action-adventure" category, a "war" game category, etc.). Accordingly, the generic skill rating algorithm can be generated for a particular game category (e.g., may also or alternatively be referred to as a game "mode"). Prior to enabling access to the generic skill rating algorithm, the system can determine that the new title belongs to, or is part of, the particular game category. For example, the system can analyze a description of the game to determine that the new title belongs to the game category. In another example, the new title can include a label that indicates the game category. In yet another example, the system can determine that a new title satisfies a gaming similarity threshold associated with the game category, thereby indicating that there is sufficient overlap in player interactions (e.g., controller input) and/or player behavior/objectives required to be successful.

Once the generic skill rating algorithm is generated based on an aggregate of parameters and parameter weights that already exist in established skill rating algorithms of other titles, the system is configured to aggregate, organize, and plug participant performance data into the generic skill rating algorithm so that a skill rating for the participant can be generated (e.g., calculated). In various examples, the system has access to a participant's performance data based on completed sessions of one or more titles in a particular game category. For instance, the system configured to generate the generic skill rating algorithm may also be a multiplayer game hosting system configured to host sessions of various titles. Accordingly, the system can be configured to track and store a participant's performance data. In some implementations, there may be privacy concerns with respect to the participant performance data, and thus, the techniques described herein enable skill-based matching using the generic skill rating algorithm without the system having to share the actual participant performance data. That is, the system generates the generic skill rating algorithm, plugs the participant performance data into the generic skill rating algorithm when called upon by a new title, and provides a participant skill rating to the new title. However, the participant performance data is not provided to the new title. Rather, only the participant skill rating produced via the generic skill rating algorithm is provided to the new title.

The provision (e.g., network transmission) of the participant skill rating, as opposed to the large amount of participant performance data, conserves network bandwidth and/or processing/memory resources of a system hosting a session of a new title. For instance, the system hosting the session of the new title is able to avoid expending resources (e.g., network resources, memory resources, processing resources, etc.) to retrieve, store, and process all the participant performance data to determine a skill rating. Instead, the system hosting the session of the new title benefits from an ability to call on a skill rating system to provide a generic skill rating for participant matching purposes.

In various examples, an individual parameter of a skill rating algorithm can relate to one of the following types of participant performance data useable to evaluate skill: session results or outcomes (e.g., wins, losses, draws, order of finish in session standings, etc.), quality of opponents (e.g., whether a participant beat or lost to a high-rated opponent, whether a participant beat or lost to a low-rated opponent, etc.), differences in results between session participants (e.g., margin of victory, margin of defeat, etc.), a number of sessions played, and/or game statistics that correspond to a likelihood of success. In many examples, game statistics that are tracked and stored can be specific to a game category. For example, game statistics for a first-person shooter game title can include a number of head shots, a ratio based on a number of targets hit to a total number of bullets shot, a number of deaths caused, etc. In another example, game statistics for a soccer game title can include a time of possession (e.g., for a 90-minute game), a number of shots on goal, a number of corner kicks, a number of fouls committed, etc.

As described above, developers of titles and/or operators of multiplayer game hosting systems may create and use a variety of different skill rating algorithms to evaluate and rate participants. An individual skill rating algorithm uses a set of parameters. Moreover, each parameter can be associated with a weight that determines how much the parameter contributes to an overall rating determined by a skill rating algorithm. Accordingly, the parameters used and/or the weights can vary from one skill rating algorithm to the next. The generic skill rating algorithm described herein can be created based on an aggregate of the parameters and the weights used in the different skill rating algorithms.

Consequently, the system can use skill rating algorithms that already exist to generate a generic skill rating algorithm that can be used by new titles to determine a representative skill rating for a participant. Participant performance data created based on completed sessions of other titles can be aggregated, organized, and plugged into the generic skill rating algorithm to determine the representative skill rating. The representative skill rating can be used to immediately match the participant with other participants while actual participant performance data for the new title is gathered based on completed sessions of the new title. The actual participant performance data for the new title can then be used to generate a more accurate skill rating. Further, the new title can eventually (e.g., over a time period after public release) develop its own algorithm for skill rating based on its own set of selected parameters. Thus, the representative skill rating described herein enables the system to improve participant matching techniques in situations where there is little or no participant performance data specific to the new title.

A participant in a multiplayer session can comprise an individual player of the multiplayer session, or alternatively, a participant can comprise a team of players in the multiplayer session (e.g., a team can have two or more players). A multiplayer session can comprise all or a portion of any category of game that can be executed by computing devices in order to allow participants to partake in the multiplayer session.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Described herein are systems and techniques for generating a skill rating of a participant with respect to a new title. The system is configured to generate a generic skill rating algorithm based on an aggregate of parameters and parameter weights that already exist in established skill rating algorithms of other titles of a particular game category. Once the generic skill rating algorithm is generated, the system is configured to aggregate, organize, and plug participant performance data into the generic skill rating algorithm so that a representative skill rating for the participant can be generated (e.g., calculated). The representative skill rating is provided to the new title thereby enabling the new title to effectively match participants in a multiplayer session of the new title such that a fair and a competitive gaming experience is realized.

Some developers of titles may create and/or use their own skill rating algorithms established based on a set of parameters that have been selected. However, in many cases, a developer of a new title may not have the resources (e.g., time, budget, etc.) to create and use its own skill rating algorithm to match participants prior to and during the public release of the new title. Accordingly, the developer of the new title does not have an effective way to match participants based on skill level (e.g., this may be referred to as a "cold start" problem). For instance, an experienced participant who often plays titles that are similar to the new title may be paired with a novice participant that rarely plays titles that are similar to the new title. In this situation, the gaming experience will likely be sub-optimal for both the experienced participant and the novice participant. That is, the experienced participant is not presented with a challenging opponent, and therefore, the experienced participant may be frustrated with the gaming experience. On the other side, the novice participant's initial gaming experience may also be frustrating because he/she is dominated by a much better participant. This is consequential because, according to some studies, if a player of a new title has a bad experience (e.g., clearly has inferior skills compared to an opponent and therefore is beaten badly) in the first two or three multiplayers sessions of the new title played, then the player is likely to play other titles and never play the new title again due to the bad experiences. Thus, matching players of a new title based on skill level to increase the likelihood of a fair and a competitive gaming experience, is paramount to game developers, game publishers, and/or systems that host multiplayer sessions of a new title.

Furthermore, in various examples, the techniques described herein enable a system hosting a session of a new title to request a representative skill rating for a participant and, in response, the representative skill rating can be provided (e.g., via network transmission) without having to also provide a large amount of participant performance data which then needs to be stored and processed via the system hosting the session of the new title to generate a skill rating. This conserves network bandwidth, as well as processing and/or memory resources of the system hosting the session of the new title. For instance, the system hosting the session of the new title is able to avoid expending resources (e.g., network resources, memory resources, processing resources, etc.) to retrieve, store, and process all the participant performance data to determine a skill rating. This type of configuration also accommodates the privacy (e.g., access restrictions) of the participant performance data, which is based on completed sessions of titles other than the new title.

Various examples, scenarios, and aspects that effectively match players based on skill are described below with reference to FIGS. 1-4.

Figure 1:
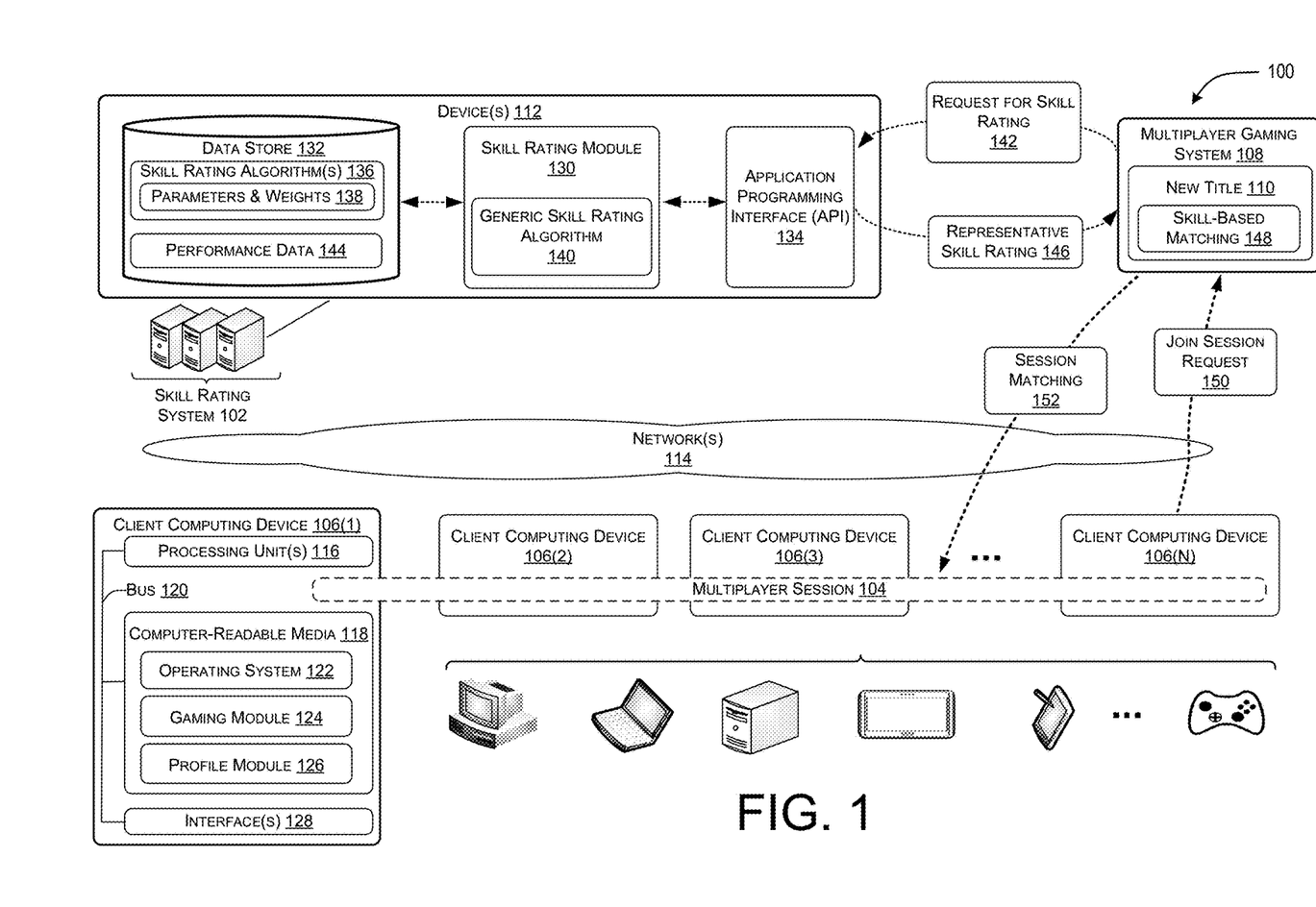
FIG. 1 is a diagram illustrating an example environment in which a skill rating system can operate to generate a representative skill rating for a participant of a multiplayer session of a new title.

FIG. 1 is a diagram illustrating an example environment 100 in which a skill rating system 102 can operate to generate a representative skill rating for a participant of a multiplayer session 104 in which various client computing devices 106(1) through 106(N) are participating (where N is a positive integer number such as two, three, four, five, ten, fifteen, twenty, fifty, one hundred, and so forth).

As described above, the client computing devices 106(1) through 106(N) enable players to participate, individually or as a team, in the multiplayer session 104. The multiplayer session 104 can be hosted, over a network, by a multiplayer gaming system 108 (e.g., PLAYSTATION NOW, NINTENDO NETWORK, XBOX LIVE, etc.). That is, the multiplayer gaming system 108 can provide a multiplayer session service enabling users of the client computing devices 106(1) through 106(N) to participate in the multiplayer session 104 established for a new title 110. In some examples, the new title 110 comprises the multiplayer gaming system 108. As an alternative, the multiplayer game session 104 can be hosted by one of the client computing devices 106(1) through 106(N) without the use of a multiplayer gaming system 108.

The skill rating system 102 comprises device(s) 112. The device(s) 112 and/or other components of the skill rating system 102 can include distributed computing resources that communicate with one another, with the multiplayer gaming system 108, and/or with the client computing devices 106(1) through 106(N) via one or more network(s) 114. In some examples, the skill rating system 102 can be part of the multiplayer gaming system 108 that includes the new title 110 (e.g., resources within the system called upon to generate and provide skill ratings) or another multiplayer gaming system, while in other examples, the skill rating system 102 is an independent system that is tasked with providing a skill rating for a new game title 110.

Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

In some examples, network(s) 114 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, device(s) 112 can include one or more computing devices that operate in a cluster or other grouped configuration to share resources, balance load, increase performance, provide fail-over support or redundancy, or for other purposes. For instance, device(s) 112 can belong to a variety of classes of devices such as traditional server-type devices, desktop computer-type devices, and/or mobile-type devices. Thus, although illustrated as a single type of device—a server-type device—device(s) 112 can include a diverse variety of device types and are not limited to a particular type of device. Device(s) 112 can represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) can belong to a variety of classes of devices, which can be the same as, or different from, device(s) 112, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant (PDA), a mobile phone/tablet hybrid, a laptop computer, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorders (PVR), a set-top box, a camera, an integrated component (e.g., a peripheral device) for inclusion in a computing device, an appliance, or any other sort of computing device. In some implementations, a client computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 116 operably connected to computer-readable media 118 such as via a bus 120, which in some instances can include one or more of a system bus, a data bus, an address bus, a PCI bus, a Mini-PCI bus, and any variety of local, peripheral, and/or independent buses.

Executable instructions stored on computer-readable media 118 can include, for example, an operating system 122, a gaming module 124, a profile module 126, and other modules, programs, or applications that are loadable and executable by processing units(s) 116.

Client computing device(s) 106(1) through 106(N) can also include one or more interface(s) 128 to enable communications between client computing device(s) 106(1) through 106(N) and other networked devices, such as device(s) 112 and/or devices of the multiplayer gaming system 108, over network(s) 114. Such network interface(s) 128 can include one or more network interface controllers (NICs) or other types of transceiver devices to send and receive communications and/or data over a network.

In the example environment 100 of FIG. 1, client computing devices 106(1) through 106(N) can use their respective gaming module 124 to connect with one another and/or other external device(s) in order to participate in the multiplayer session 104. For instance, a player can utilize a client computing device 106(1) to access the new title 110. When executing the new title 110, the player can select a multiplayer mode, which can cause the client computing device 106(1) to connect to a game hosting device and/or other client computing devices 106(2) through 106(N) over the network(s) 114. The player can then use the client computing device 106(1) to register as a player, and/or as a member of a team, view and/or play in the multiplayer game session 104, and receive updates and/or results for the multiplayer session 104.

The client computing device(s) 106(1) through 106(N) can use their respective profile module 126 to generate and/or receive participant profiles, and provide the participant profiles to other client computing devices, to game hosting devices, and/or to the device(s) 112 of the skill rating system 102. A participant profile can include one or more of an identity of a participant (e.g., a name, a unique identifier (ID), a gaming tag or ID, etc.), a skill rating for the participant, an age of the participant, a friends list for the participant, a location of the participant, etc. Participant profiles can be used to register participants for multiplayer sessions. In some examples, the skill rating system 102 and/or the multiplayer gaming system 108 maintain profile information and relevant historical data (e.g., participant identity, participant performance data, etc.) and can provide, upon request, the profile information to clients and/or services as required and as authorized (e.g., upon receiving authorized player credentials) so that the system can ensure the client or the service is trusted.

As illustrated in FIG. 1, the device(s) 112 of the skill rating system 102 comprises a skill rating module 130, a data store 132, and/or an application programming interface (API) 134. In various examples, the skill rating module 130 is configured to access the data store 132 which stores established skill rating algorithms 136 that include parameters and weights for the parameters 138. The skill rating module 130 is configured to generate a generic skill rating algorithm 140 based on an aggregate of the parameters and weights 138 that already exist in the established skill rating algorithms 136 of other titles of a particular game category. Upon receiving information (e.g., via an API 134) that indicates a skill rating is requested 142 for a participant in a multiplayer session 104 of the new title 110, the skill rating module 130 is configured to access performance data 144 for the participant and plug the performance data 144 into the generic skill rating algorithm 140 so that a representative skill rating for the participant can be generated (e.g., calculated). In various examples, the performance data 144 includes data of titles that are specific to a particular game category (e.g., a "first-person shooter" category). Consequently, the skill rating system 102 can provide the representative skill rating 146 to the new title 110 and/or to multiplayer gaming system 108 so that skill-based matching 148 can be performed for a multiplayer session 104. For instance, a participant associated with client computing device 106(N) can request to join a session 150, and in response, can be matched 152 with other participants of client computing devices 106(1) through 106(3).

In some examples, the multiplayer gaming system 108 can comprise "platform" components that are configured to generate and render platform content that can enhance a session experience for a participant while the participant engages with the game content provided by the new title 110 (e.g., a player plays a game). In various examples described herein, program code of the new title 110 is executable to generate the game content and is configured to access and use (e.g., via the API 134) functionality related to determination of the representative skill rating 146.

Figure 2:
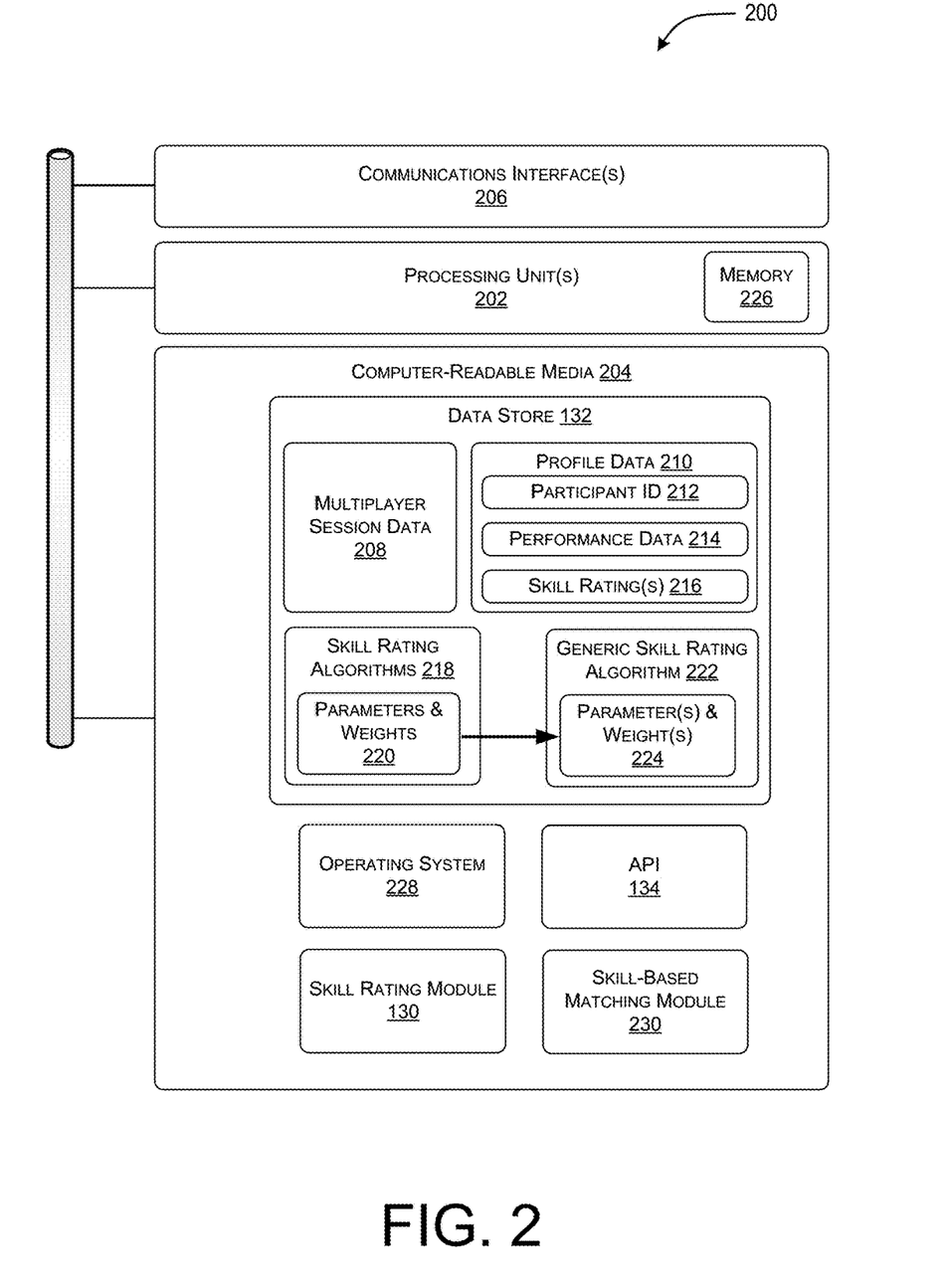
FIG. 2 is a diagram illustrating components of an example device configured to generate a representative skill rating for a participant of a multiplayer session of a new title.

FIG. 2 is a diagram illustrating components of an example device 200 configured to generate a representative skill rating for a participant of a multiplayer session 104 based on a known skill rating for the participant. Device 200 can represent one of device(s) 112. Device 200 includes one or more processing unit(s) 202, computer-readable media 204, communication interface(s) 206. The components of device 200 are operatively connected, for example, via a bus, which can include one or more of a system bus, a data bus, an address bus, a PCI bus, a Mini-PCI bus, and any variety of local, peripheral, and/or independent buses.

As used herein, processing unit(s), such as processing unit(s) 202 and/or processing unit(s) 116, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 204 and/or computer-readable media 118, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 can represent, for example, network interface controllers (NICs) or other types of transceiver devices to send and receive communications over a network.

In the illustrated example, computer-readable media 204 includes the data store 132. In some examples, data store 132 includes data storage such as a database, data warehouse, or other type of structured or unstructured data storage. In some examples, data store 132 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Data store 132 can store data for the operations of processes, applications, components, and/or modules stored in computer-readable media 204 and/or executed by processing unit(s) 202 and/or accelerator(s). For instance, in some examples, data store 132 can store multiplayer session data 208 and profile data 210. The multiplayer session data 208 can comprise a total number of participants in the multiplayer session 104, a category of the multiplayer title, activity that occurs in the multiplayer session 104 (e.g., behavior, maneuvers, earned points or a score, and/or achievements of the participants), and/or other data related to when and how the multiplayer session 104 is conducted or hosted. Examples of profile data 210 include, but are not limited to, a participant identity (ID) 212 and/or performance data 214 (e.g., performance data 144) that is useable by one or more skill rating algorithm(s) to determine skill rating(s) 216, including the representative skill rating generated for a new title, as described herein.

Further, the data store can comprise various established skill rating algorithms 218 (e.g., skill rating algorithms 136) that individually include a set of parameters and corresponding weights 220 (e.g., parameters and weights 138), as well as the generic skill rating algorithm 222 (e.g., generic skill rating algorithm 140) useable to generate a representative skill rating for a new title. As described above, the skill rating module 130 is configured to generate the generic skill rating algorithm 222 based on an aggregate of the parameters and weights 220 that already exist in the established skill rating algorithms 218 used by other titles. Consequently, the generic skill rating algorithm includes its own set of parameters and corresponding weights 224.

Alternately, some or all of the above-referenced data can be stored on separate memories 226 on board one or more processing unit(s) 202 such as a memory on board a CPU-type processor, a GPU-type processor, an FPGA-type accelerator, a DSP-type accelerator, and/or another accelerator. In the illustrated example of FIG. 2, computer-readable media 204 also includes operating system 228 and application programming interface(s) 134 configured to expose the functionality and the data of the device(s) 112 (e.g., example device 200) to external devices associated with, for example, game publishers, game developers, tournament organizers, and/or the participants (e.g., client computing devices 106 (1) through 106(N)). Additionally, computer-readable media 204 includes one or more modules such as the skill rating module 130 and/or a skill-based matching module 230 configured to use skill ratings to match participants in a multiplayer session of a title, although the number of illustrated modules is just an example, and the number can vary higher or lower. That is, functionality described herein in association with the illustrated modules can be performed by a fewer number of modules or a larger number of modules on one device or spread across multiple devices.

Figure 3:
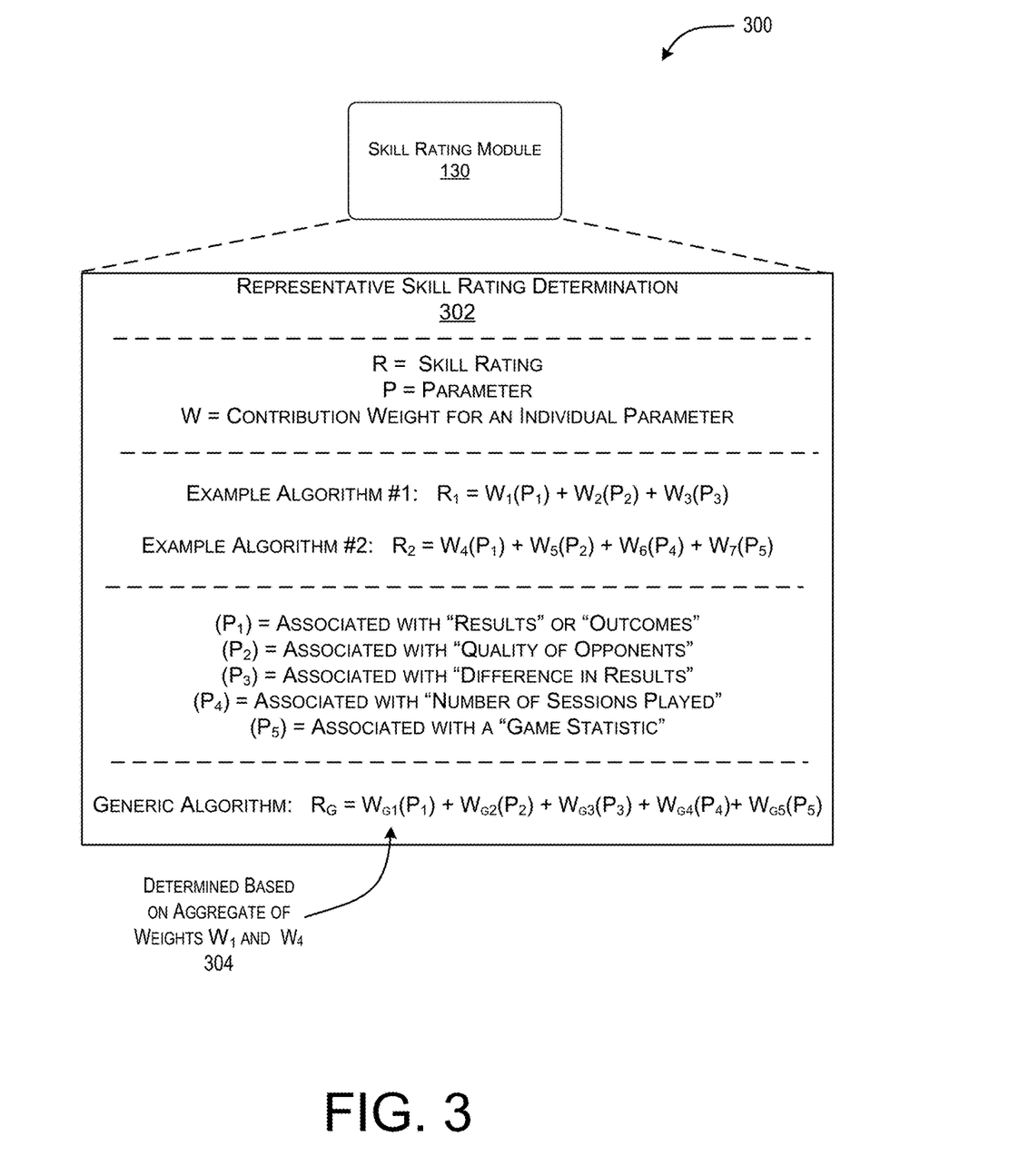
FIG. 3 is a diagram illustrating an example of how the generic skill rating algorithm can be generated.

FIG. 3 is a diagram 300 illustrating an example of how the generic skill rating algorithm can be generated and how the representative skill rating is determined 302 (e.g., by the skill rating module 130). As illustrated, for an individual skill rating algorithm, "R" represents the calculated skill rating, "P" represents an individual parameter evaluated when calculating the skill rating, and "W" represents a contribution weight for an individual parameter. As described above, various skill rating algorithms for different titles that belong to a same game category may use different parameters and/or weights, and therefore, different skill ratings may be calculated for an individual participant.

An individual parameter, P, can relate to one of: session results or outcomes (e.g., wins, losses, draws, order of finish in session standings, etc.), quality of opponents (e.g., whether a participant beat or lost to a high-rated opponent, whether a participant beat or lost to a low-rated opponent, etc.), differences in results between session participants (e.g., margin of victory, margin of defeat, etc.), a number of sessions played, and/or game statistics that correspond to a likelihood of success. In many examples, game statistics that are tracked and stored can be specific to a game category.

FIG. 3 illustrates an example where a first established skill rating algorithm (e.g., "Example Algorithm #1") calculates a skill rating, $R_1$, based on $P_1$, $P_2$, and $P_3$, where $P_1$, $P_2$, and $P_3$ have respective weights $W_1$, $W_2$, and $W_3$. Moreover, a second established skill rating algorithm (e.g., "Example Algorithm #2") calculates a skill rating, $R_2$, based on $P_1$, $P_2$, $P_4$, and $P_5$, where $P_1$, $P_2$, $P_4$, and $P_5$ have respective weights $W_4$, $W_5$, $W_6$, and $W_7$. This shows how the parameters used and the weights associated with each parameter can vary from one skill rating algorithm to the next. For instance, $P_1$ can be associated with results or outcomes, and thus, participant performance data (e.g., a value or a score) that reflects the participant's results or outcomes for sessions of a title played can be plugged into a skill rating algorithm to contribute to a skill rating. $P_2$ can be associated with quality of opponents, and thus, participant performance data that reflects the participant's quality of opponents for sessions of a title played can be plugged into a skill rating algorithm to contribute to a skill rating. $P_3$ can be associated with differences in results (e.g., average margin of victory or defeat), and thus, participant performance data that reflects the participant's differences in results for sessions of a title played can be plugged into a skill rating algorithm to contribute to a skill rating. $P_4$ can be associated with a number of sessions played, and thus, participant performance data that reflects the participant's number of sessions played for a title can be plugged into a skill rating algorithm to contribute to a skill rating. $P_5$ can be associated with a game statistic, and thus, participant performance data that reflects the participant's game statistic for sessions of a title played can be plugged into a skill rating algorithm to contribute to a skill rating. The parameters above are described to illustrate an example, and it is understood that parameters can be added and/or removed from one skill rating algorithm to the next (e.g., based on what a title values when evaluating participant skill). For example, multiple game statistic parameters may be used to determine a skill rating. For instance, game statistics for a first-person shooter title can include a number of head shots, a ratio based on a number of targets hit to a total number of bullets shot, a number of deaths caused, etc.

FIG. 3 further illustrates the generic skill rating algorithm (e.g., the "Generic Algorithm"). As described above, the generic skill rating algorithm is generated based on an aggregate of parameters that already exist in established skill rating algorithms used by other titles (e.g., "Example Algorithm #1" and "Example Algorithm #2"). Accordingly, the generic skill rating algorithm calculates a representative skill rating, $R_G$, based on $P_1$, $P_2$, $P_3$, $P_4$, and $P_5$ (e.g., an aggregate of the parameters used in "Example Algorithm #1" and "Example Algorithm #2"). Moreover, the generic skill rating algorithm is generated based on an aggregate of weights used in the established skill rating algorithms. Accordingly, the generic skill rating algorithm calculates a representative skill rating, $R_G$, based on $W_{G1}$ (e.g., determined based on an aggregate of weights $W_1$ and $W_4$ 304), $W_{G2}$ (e.g., determined based on $W_2$ and $W_5$), $W_{G3}$ (e.g., determined based on $W_3$), $W_{G4}$ (e.g., determined based on $W_6$), and $W_{G5}$ (e.g., determined based on $W_7$). Stated another way, the skill rating module 130 is configured to consider and analyze the individual weights associated with the parameters used in the established skill rating algorithms to determine the weights used in the generic skill rating algorithm. Moreover, the skill rating module 130 can make adjustments to the weights (e.g., to ensure that all the weights add up to 1.0 or 100%). This way, the generic skill rating algorithm is generated to effectively represent the information (e.g., parameters and weights) used in various different skill rating algorithms. In various examples, the skill rating module 130 is configured to use supplemental information to determine which parameters are more important to a likelihood of success so that those parameters can be weighted more than other parameters.

In various examples, the generic skill rating algorithm can be generated to include parameters that are common to multiple (e.g., at least two) skill rating algorithms used in multiple titles in a game category. This implementation removes the effect of an outlier parameter that is unique to a specific title, and thus, may not be applicable to the new title. For example, if the game statistic represented by $P_5$ is only tracked and used by a specific title for rating purposes, then $P_5$ may not be used in the generic skill rating algorithm, or may have a nominal weight. The use of common parameters enables a more streamlined generation process that can also conserve memory and processing resources by ignoring parameters that are unique to a specific title.

The skill rating module 130 can also aggregate participant performance data across various titles and plug the aggregated participant performance data into the generic skill rating algorithm. For example, results and outcomes data can be aggregated across various titles to determine an overall results and outcomes score to be plugged into the generic skill rating algorithm. In another example, a game statistic associated with a ratio based on a number of targets hit to a total number of bullets shot can be aggregated across various titles to determine an overall ratio (e.g., a value) based on a number of targets hit to a total number of bullets shot, and the overall ratio can be plugged into the generic skill rating algorithm.

In some implementations, there may be privacy concerns with respect to the participant performance data, and thus, the use of the generic skill rating algorithm and the calculation of $R_G$ enables skill-based matching for a session of a new title without having to share the actual participant performance data. Rather, only the participant skill rating produced via the generic skill rating algorithm is provided to the new title. As described above, the provision of the participant skill rating algorithm rather than all the participant performance data conserves computing resources (e.g., networking resources, memory resources, processing resources, etc.).

Once determined, the representative skill rating can be provided and used to immediately match the participant with other participants in a multiplayer session of a new title. Thus, the representative skill rating enables improved participant matching techniques in situations where there is little or no participant performance data specific to the new title.

While FIG. 3 illustrates that two example skill rating algorithms are used to generate the generic skill rating algorithm, it is understood in the context of this disclosure that more than two (e.g., three, four, five, etc.) skill rating algorithms can be used to generate the generic skill rating algorithm.

Figure 4:
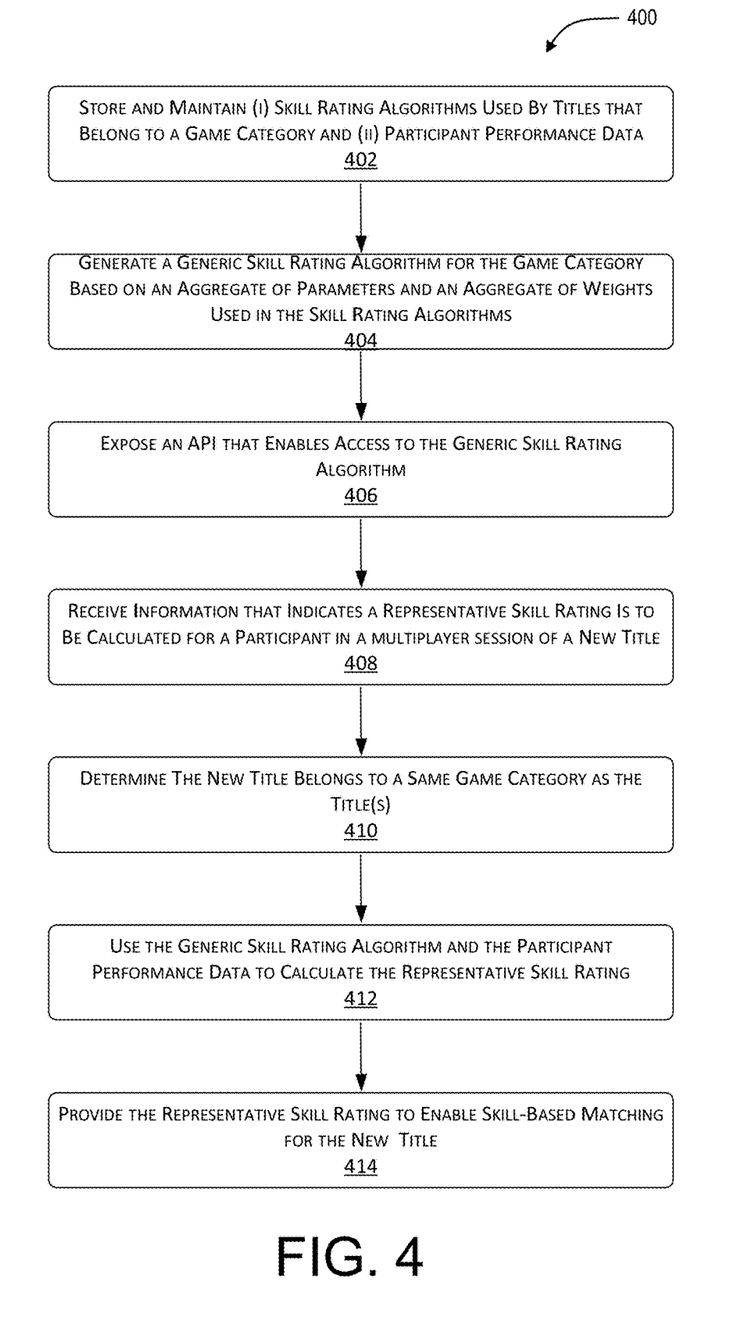
FIG. 4. is a flow diagram of an example method for generating a representative skill rating for a participant of a multiplayer session for a new title.

FIG. 4 represent an example process in accordance with various examples from the description of FIGS. 1-3. The example operations shown in FIG. 4 can be implemented on or otherwise embodied in one or more distributed computing resources such as the device(s) 112 of the skill rating system 102, devices of the multiplayer gaming system 108, and/or the client computing devices 106(1) through 106(N).

The order in which the operations are described is not intended to be construed as a limitation, and any number of the described operations can be combined in any order and/or in parallel to implement each process. Moreover, the operations in FIG. 4 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations. In the context of hardware, the operations can represent logic functions implemented in circuitry (e.g., datapath-control and finite-state-machine sequencing functions).

FIG. 4 is a flow diagram of an example method 400 for generating a representative skill rating for a participant in a multiplayer session for a new title.

At 402, skill rating algorithms used by titles that belong to a game category, as well as participant performance data, are stored and maintained.

At 404, a generic skill rating algorithm is generated for the game category based on an aggregate of parameters and an aggregate of weights used in the skill rating algorithms.

At 406, an application programming interface is exposed to enable access to the generic skill rating algorithm.

At 408, information that indicates a representative skill rating is to be generated for a participant in a multiplayer session of a new title is received.

At 410, it is determined that the new title belongs to a same game category as the titles that use the established skill rating algorithms.

At 412, the generic skill rating algorithm is and the participant performance data are used to calculate the representative skill rating for the participant in the multiplayer session of the new title.

At 414, the representative skill rating is provided to enable skill-based matching for the multiplayer session of the new title (e.g., match the participant with other participants).

The disclosure presented herein may be considered in view of the following example clauses.

Example Clause A, a system comprising: one or more processing units; a data store comprising (i) a plurality of skill rating algorithms used by a plurality of titles that belong to a same game category, an individual skill rating algorithm including a set of parameters and corresponding weights useable to determine a skill rating of a participant, and (ii) performance data for the participant based on completed sessions of the plurality of titles; and a computer-readable medium having encoded thereon computer-executable instructions to configure the one or more processing units to: generate a generic skill rating algorithm based on the set of parameters included in each skill rating algorithm of the plurality of skill rating algorithms, wherein an individual weight for an individual parameter used in the generic skill rating algorithm is determined based on an aggregate of weights used for the individual parameter across the plurality of skill rating algorithms; expose an application programming interface that enables access to the generic skill rating algorithm for a new title; receive, via the application programming interface, information that indicates a representative skill rating is to be calculated for the participant in a multiplayer session of the new title; determine that the new title belongs to the same game category as the plurality of titles; based on the determining that the new title belongs to the same game category as the plurality of titles, use the generic skill rating algorithm and the performance data for the participant to calculate the representative skill rating for the participant; and provide the representative skill rating to enable matching of the participant with one or more other participants in the multiplayer session of the new title.

Example Clause B, the system of Example Clause A, wherein an individual parameter comprises results or outcomes of multiplayer sessions played.

Example Clause C, the system of Example Clause A or Example Clause B, wherein an individual parameter comprises quality of opponents of multiplayer sessions played.

Example Clause D, the system of any one of Example Clause A through Example Clause C, wherein an individual parameter comprises differences in results or outcomes of multiplayer sessions played.

Example Clause E, the system of any one of Example Clause A through Example Clause D, wherein an individual parameter comprises a game statistic that reflects an amount of success in multiplayer sessions.

Example Clause F, the system of Example Clause E, wherein the game statistic is specific to the same game category to which the new title and the plurality of titles belong.

Example Clause G, the system of any one of Example Clause A through Example Clause F, wherein an individual parameter comprises a number of multiplayer sessions played.

Example Clause H, the system of any one of Example Clause A through Example Clause G, wherein the application programming interface enables access to the generic skill rating algorithm and provision of the representative skill rating without sharing the performance data for the participant to the new title.

While the subject matter of Example Clauses A through H is described above with respect to a system, it is understood in the context of this document that the subject matter of Example Clauses A through H can additionally or alternatively be implemented by a device, as a method, and/or via computer-readable storage media.

Example Clause I, a method comprising: storing (i) a plurality of skill rating algorithms used by a plurality of titles that belong to a same game category, an individual skill rating algorithm including a set of parameters and corresponding weights useable to determine a skill rating of a participant, and (ii) performance data for the participant based on completed sessions of the plurality of titles; generating, by one or more processing units, a generic skill rating algorithm based on the set of parameters included in each skill rating algorithm of the plurality of skill rating algorithms, wherein an individual weight for an individual parameter used in the generic skill rating algorithm is determined based on an aggregate of weights used for the individual parameter across the plurality of skill rating algorithms; exposing an application programming interface that enables access to the generic skill rating algorithm for a new title; receiving, via the application programming interface, information that indicates a representative skill rating is to be calculated for the participant in a multiplayer session of the new title; determining that the new title belongs to the same game category as the plurality of titles; based on the determining that the new title belongs to the same game category as the plurality of titles, using the generic skill rating algorithm and the performance data for the participant to calculate the representative skill rating for the participant; and providing the representative skill rating to enable matching of the participant with one or more other participants in the multiplayer session of the new title.

Example Clause J, the method of Example Clause I, wherein an individual parameter comprises results or outcomes of multiplayer sessions played.

Example Clause K, the method of Example Clause J or Example Clause I, wherein an individual parameter comprises quality of opponents of multiplayer sessions played.

Example Clause L, the method of any one of Example Clause I through Example Clause K, wherein an individual parameter comprises differences in results or outcomes of multiplayer sessions played.

Example Clause M, the method of any one of Example Clause I through Example Clause L, wherein an individual parameter comprises a game statistic that reflects an amount of success in multiplayer sessions.

Example Clause N, the method of Example Clause M, wherein the game statistic is specific to the same game category to which the new title and the plurality of titles belong.

Example Clause O, the method of any one of Example Clause I through Example Clause N, wherein an individual parameter comprises a number of multiplayer sessions played.

Example Clause P, the method of any one of Example Clause I through Example Clause O, wherein the application programming interface enables access to the generic skill rating algorithm and provision of the representative skill rating without sharing the performance data for the participant to the new title.

While the subject matter of Example Clauses I through P is described above with respect to a method, it is understood in the context of this document that the subject matter of Example Clauses I through P can additionally or alternatively be implemented by a device, by a system, and/or via computer-readable storage media.

Example Clause Q, a system comprising: one or more processing units; a data store comprising (i) a plurality of skill rating algorithms used by a plurality of titles that belong to a same game category, an individual skill rating algorithm including a set of parameters and corresponding weights useable to determine a skill rating of a participant, and (ii) performance data for the participant based on completed sessions of the plurality of titles; and a computer-readable medium having encoded thereon computer-executable instructions to configure the one or more processing units to: generate a generic skill rating algorithm based on the set of parameters included in each skill rating algorithm of the plurality of skill rating algorithms, wherein an individual weight for an individual parameter used in the generic skill rating algorithm is determined based on an aggregate of weights used for the individual parameter across the plurality of skill rating algorithms; receive information that indicates a representative skill rating is to be calculated for the participant in a multiplayer session of a new title; determine that the new title belongs to the same game category as the plurality of titles; based on the determining that the new title belongs to the same game category as the plurality of titles, use the generic skill rating algorithm and the performance data for the participant to calculate the representative skill rating for the participant; and provide the representative skill rating to enable matching of the participant with one or more other participants in the multiplayer session of the new title.

Example Clause R, the system of Example Clause Q, wherein an individual parameter comprises a game statistic that reflects an amount of success in multiplayer sessions.

Example Clause S, the system of Example Clause R, wherein the game statistic is specific to the same game category to which the new title and the plurality of titles belong.

Example Clause T, the system of any one of Example Clause Q through Example Clause S, wherein each parameter used in the generic skill rating algorithm is common to at least two of the plurality of skill rating algorithms.

While the subject matter of Example Clauses S and T is described above with respect to a system, it is understood in the context of this document that the subject matter of Example Clauses S and T can additionally or alternatively be implemented by a device, as a method, and/or via computer-readable storage media.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processing units;
a data store comprising (i) a plurality of skill rating algorithms used by a plurality of titles that belong to a same game category, an individual skill rating algorithm including a set of parameters and corresponding weights useable to determine a skill rating of a participant, and (ii) performance data for the participant based on completed sessions of the plurality of titles; and
a computer-readable medium having encoded thereon computer-executable instructions to configure the one or more processing units to:
generate a generic skill rating algorithm based on the set of parameters included in each skill rating algorithm of the plurality of skill rating algorithms, wherein an individual weight for an individual parameter used in the generic skill rating algorithm is determined based on an aggregate of weights used for the individual parameter across the plurality of skill rating algorithms;

expose an application programming interface that enables access to the generic skill rating algorithm for a new title;

receive, via the application programming interface, information that indicates a representative skill rating is to be calculated for the participant in a multiplayer session of the new title;

determine that the new title belongs to the same game category as the plurality of titles;

based on the determining that the new title belongs to the same game category as the plurality of titles, use the generic skill rating algorithm and the performance data for the participant to calculate the representative skill rating for the participant; and provide the representative skill rating to enable matching of the participant with one or more other participants in the multiplayer session of the new title.

2. The system of claim 1, wherein an individual parameter comprises results or outcomes of multiplayer sessions played.

3. The system of claim 1, wherein an individual parameter comprises quality of opponents of multiplayer sessions played.

4. The system of claim 1, wherein an individual parameter comprises differences in results or outcomes of multiplayer sessions played.

5. The system of claim 1, wherein an individual parameter comprises a game statistic that reflects an amount of success in multiplayer sessions.

6. The system of claim 5, wherein the game statistic is specific to the same game category to which the new title and the plurality of titles belong.

7. The system of claim 1, wherein an individual parameter comprises a number of multiplayer sessions played.

8. The system of claim 1, wherein the application programming interface enables access to the generic skill rating algorithm and provision of the representative skill rating without sharing the performance data for the participant to the new title.

9. A method comprising:

storing (i) a plurality of skill rating algorithms used by a plurality of titles that belong to a same game category, an individual skill rating algorithm including a set of parameters and corresponding weights useable to determine a skill rating of a participant, and (ii) performance data for the participant based on completed sessions of the plurality of titles;

generating, by one or more processing units, a generic skill rating algorithm based on the set of parameters included in each skill rating algorithm of the plurality of skill rating algorithms, wherein an individual weight for an individual parameter used in the generic skill rating algorithm is determined based on an aggregate of weights used for the individual parameter across the plurality of skill rating algorithms;

exposing an application programming interface that enables access to the generic skill rating algorithm for a new title;

receiving, via the application programming interface, information that indicates a representative skill rating is to be calculated for the participant in a multiplayer session of the new title;

determining that the new title belongs to the same game category as the plurality of titles;

based on the determining that the new title belongs to the same game category as the plurality of titles, using the generic skill rating algorithm and the performance data for the participant to calculate the representative skill rating for the participant; and providing the representative skill rating to enable matching of the participant with one or more other participants in the multiplayer session of the new title.

10. The method of claim 9, wherein an individual parameter comprises results or outcomes of multiplayer sessions played.

11. The method of claim 9, wherein an individual parameter comprises quality of opponents of multiplayer sessions played.

12. The method of claim 9, wherein an individual parameter comprises differences in results or outcomes of multiplayer sessions played.

13. The method of claim 9, wherein an individual parameter comprises a game statistic that reflects an amount of success in multiplayer sessions.

14. The method of claim 13, wherein the game statistic is specific to the same game category to which the new title and the plurality of titles belong.

15. The method of claim 9, wherein an individual parameter comprises a number of multiplayer sessions played.

16. The method of claim 9, wherein the application programming interface enables access to the generic skill rating algorithm and provision of the representative skill rating without sharing the performance data for the participant to the new title.

17. A system comprising:

one or more processing units;

a data store comprising (i) a plurality of skill rating algorithms used by a plurality of titles that belong to a same game category, an individual skill rating algorithm including a set of parameters and corresponding weights useable to determine a skill rating of a participant, and (ii) performance data for the participant based on completed sessions of the plurality of titles; and a computer-readable medium having encoded thereon computer-executable instructions to configure the one or more processing units to:

generate a generic skill rating algorithm based on the set of parameters included in each skill rating algorithm of the plurality of skill rating algorithms, wherein an individual weight for an individual parameter used in the generic skill rating algorithm is determined based on an aggregate of weights used for the individual parameter across the plurality of skill rating algorithms;

receive information that indicates a representative skill rating is to be calculated for the participant in a multiplayer session of a new title;

determine that the new title belongs to the same game category as the plurality of titles;

based on the determining that the new title belongs to the same game category as the plurality of titles, use the generic skill rating algorithm and the performance data for the participant to calculate the representative skill rating for the participant; and provide the representative skill rating to enable matching of the participant with one or more other participants in the multiplayer session of the new title.

18. The system of claim 17, wherein an individual parameter comprises a game statistic that reflects an amount of success in multiplayer sessions.

19. The system of claim 18, wherein the game statistic is specific to the same game category to which the new title and the plurality of titles belong.

20. The system of claim 17, wherein each parameter used in the generic skill rating algorithm is common to at least two of the plurality of skill rating algorithms.

* * * * *